(12) United States Patent
Fontana et al.

(10) Patent No.: US 11,556,981 B1
(45) Date of Patent: *Jan. 17, 2023

(54) DEFAULT SHARING BETWEEN FREQUENTLY USED LINE OF BUSINESS PRODUCTS

(71) Applicant: Wells Fargo Bank, N.A., San Francisco, CA (US)

(72) Inventors: Laura M. Fontana, San Francisco, CA (US); Amita Kheterpal, Oakland, CA (US); Daniel Oshima, San Francisco, CA (US); Samuel Ostler, Ross, CA (US); Marria Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/167,349

(22) Filed: Feb. 4, 2021

Related U.S. Application Data

(63) Continuation of application No. 15/582,198, filed on Apr. 28, 2017, now Pat. No. 10,915,948.

(51) Int. Cl.
*G06Q 40/00* (2012.01)
*G06Q 10/10* (2012.01)
(Continued)

(52) U.S. Cl.
CPC .......... *G06Q 40/00* (2013.01); *G06Q 10/10* (2013.01); *H04L 63/04* (2013.01); *H04L 63/10* (2013.01); *H04L 67/10* (2013.01)

(58) Field of Classification Search
CPC ...... G06Q 40/00; G06Q 10/10; G06Q 10/107; G06Q 30/0269; G06Q 40/12; G06Q 50/01;
(Continued)

(56) References Cited

U.S. PATENT DOCUMENTS 7,428,531 B2    9/2008  Barron et al.
7,844,521 B1 *  11/2010 Hoag .................. G06Q 40/00
                                                      705/35
(Continued)

OTHER PUBLICATIONS

"4 Reasons to Connect LOB Applications with ECM" OnBase, Hyland 2015. Downloaded at: https://www.onbase.com/-/media/Files/hyland/article/onbase-product-article-4-reasons-to-connect-LOB-applications-with-ecm.pdf (accessed Oct. 10, 2016). 1 page.

(Continued)

*Primary Examiner* — Alexander G Kalinowski
*Assistant Examiner* — Sanjeev Malhotra
(74) *Attorney, Agent, or Firm* — Foley & Lardner LLP

(57) ABSTRACT

Systems and methods related facilitating default sharing between frequently used line of business products according to one or more example embodiments are shown. Such systems and methods make use of sharing of information between the line of business products. In some embodiments, this sharing of the data between line of business products facilitates a universal portal that may be personalized and/or customized in function and appearance. In some embodiments, the universal portal is an application on a user device that, at least, provides access to other applications running on the user device in a consolidated manner as well as additional functions present in the universal portal itself. In some embodiments, visual aspects of the presentation of applications and functionality are changed in the universal portal based on information that has been shared between different line of business products.

13 Claims, 4 Drawing Sheets

(51) Int. Cl.
*H04L 9/40* (2022.01)
*H04L 67/10* (2022.01)

(58) Field of Classification Search
CPC ........ H04M 15/00; H04L 63/04; H04L 63/10; H04L 67/10
USPC ...................... 705/7.29, 33, 35, 38, 39, 342; 379/100.15, 114.01
See application file for complete search history.

(56) References Cited

U.S. PATENT DOCUMENTS

| | | | |
|---|---|---|---|
| 8,548,930 | B2 | 10/2013 | Ross |
| 8,595,095 | B2 | 11/2013 | Borchardt et al. |
| 9,135,095 | B2 | 9/2015 | Gidman et al. |
| 2003/0140058 | A1 | 7/2003 | Martin et al. |
| 2005/0137935 | A1 | 6/2005 | Lee |
| 2006/0093110 | A1* | 5/2006 | Grear .................. G06Q 40/12 379/114.01 |
| 2006/0179064 | A1 | 8/2006 | Paz et al. |
| 2007/0100834 | A1 | 5/2007 | Landry et al. |
| 2007/0237315 | A1* | 10/2007 | Grear .................. H04L 61/4557 379/100.15 |
| 2008/0133404 | A1 | 6/2008 | Bascom |
| 2008/0255912 | A1 | 10/2008 | Christiansen et al. |
| 2009/0088883 | A1 | 4/2009 | Baier et al. |
| 2009/0249359 | A1 | 10/2009 | Caunter et al. |
| 2011/0015351 | A1 | 1/2011 | Nogi et al. |
| 2011/0119178 | A1* | 5/2011 | Clayton ................ G06Q 20/10 705/39 |
| 2011/0119188 | A1 | 5/2011 | Clayton et al. |
| 2011/0153455 | A1 | 6/2011 | Thomas |
| 2011/0153473 | A1 | 6/2011 | Thomas |
| 2011/0153517 | A1 | 6/2011 | Thomas et al. |
| 2011/0153518 | A1 | 6/2011 | Thomas et al. |
| 2011/0258578 | A1 | 10/2011 | Nair et al. |
| 2011/0283209 | A1 | 11/2011 | Levin et al. |
| 2013/0019195 | A1 | 1/2013 | Gates |
| 2013/0066763 | A1 | 3/2013 | Baker et al. |
| 2013/0124392 | A1* | 5/2013 | Achanta ................ G06Q 40/00 705/38 |
| 2014/0006261 | A1 | 1/2014 | Hogg et al. |
| 2014/0046834 | A1* | 2/2014 | Baker .................... G06Q 40/02 705/39 |
| 2014/0180719 | A1 | 6/2014 | Bell et al. |
| 2014/0258094 | A1 | 9/2014 | Jouhikainen et al. |
| 2014/0279330 | A1* | 9/2014 | Triebwasser ........... G06Q 40/02 705/35 |
| 2014/0279670 | A1* | 9/2014 | Wagner ................ G06Q 10/107 705/342 |
| 2014/0379428 | A1 | 12/2014 | Phansalkar et al. |
| 2014/0379573 | A1 | 12/2014 | Long |
| 2015/0082191 | A1 | 3/2015 | Dietz |
| 2015/0112761 | A1* | 4/2015 | Carwile, Jr .......... G06Q 10/107 705/7.29 |
| 2015/0228012 | A1 | 8/2015 | Thomas |
| 2015/0350221 | A1 | 12/2015 | Espinosa et al. |
| 2016/0063076 | A1 | 3/2016 | Martin et al. |
| 2016/0104252 | A1* | 4/2016 | Simpson ............. G06Q 40/128 705/33 |
| 2016/0267580 | A1* | 9/2016 | Unser ................... G06Q 40/00 |
| 2017/0230397 | A1 | 8/2017 | Mahaffey et al. |
| 2017/0270493 | A1 | 9/2017 | Lugli et al. |
| 2018/0011313 | A1 | 1/2018 | Nahman et al. |
| 2018/0046947 | A1* | 2/2018 | Clayton ................ G06Q 10/06 |
| 2018/0082381 | A1* | 3/2018 | Jouhikainen ........... G06Q 40/08 |
| 2022/0101383 | A1* | 3/2022 | Bloom .................. G06Q 50/01 |

OTHER PUBLICATIONS

"LoB Connect"—downloaded at http://www.informedconsulting.com/us/products/lob-connect (accessed Oct. 10, 2016). 4 pages.

* cited by examiner

DEFAULT SHARING BETWEEN FREQUENTLY USED LINE OF BUSINESS PRODUCTS

CROSS-REFERENCE TO RELATED PATENT APPLICATIONS

This application is a continuation of U.S. patent application Ser. No. 15/582,198, filed Apr. 28, 2017, the contents of which are incorporated herein by reference in its entirety.

BACKGROUND

The proliferation of the internet has fundamentally changed various aspects of individuals' lives, such as communication, work, education, finance, social and personal relationships, etc. For example, the internet has remarkably increased the amount of information available and decreased the transaction cost of obtaining such information. It has also enabled new ways to transmit the information necessary to apply for and be granted access to accounts and services of line of business products from financial institutions. Line of business products from financial institutions may include such things as bank accounts, mortgage accounts, business loans, and the like.

SUMMARY

In some embodiments, a computer-implemented method is described, performed by a computing system. The method comprises receiving data comprising a change to a first account of a first line of business product operating on a financial computing system and analyzing transaction data of the first account, by one or more processors of the computing system. The analyzing transaction data may comprise retrieving a list of needed data associated with an offer from a second line of business product operating on the financial computing system and matching the list of needed data to available data from the first account. In some embodiments, the method continues by determining a permission level is sufficient to transmit the available data from the first account to the second line of business product operating on the financial computing system, transmitting the available data to the second line of business product operating on the financial computing system, and transmitting an offer associated with the second line of business product to a computing device associated with the first account. In some embodiments, the method further comprises determining an application is installed on the computing device associated with the first account, analyzing, by the one or more processors of the computing system, a shared data between the first line of business product and the second line of business product, the shared data comprising the available data, and transmitting a parameter to the application, consequent to the analysis of the shared data, the application configured to alter a visual element of the application based on the transmitted parameter. The shared data may be analyzed by identifying an upcoming payment date associated with one of the first line of business product and the second line of business product. In some embodiments, the method further comprises determining the available data does not contain all the needed data in the list of needed data while matching the list of needed data to available data from the first account, sending a request for a missing data consequent to determining the available data does not contain all the needed data, and receiving the missing data, the available data further comprising the received missing data, consequent to sending the request. In some embodiments, the method further comprises transmitting a transaction history from one of (1) the first account of the first line of business product to the second line of business product and (2) a second account of the second line of business product to the first line of business product, consequent to determining a permission level is sufficient, wherein the shared data further comprises the transaction history, the upcoming payment data identified from the transaction history.

In some embodiments, a further computer-implemented method is described, performed by a computing system. The computer-implemented method comprises determining an application is installed on a computing device associated with a first account of a first line of business product, analyzing, by the one or more processors of the computing system, a shared data between the first line of business product and a second line of business product by identifying an upcoming event associated with one of the first line of business product and the second line of business product, and transmitting a parameter to the application, consequent to the analysis of the shared data, the application configured to alter a visual element of the application based on the transmitted parameter. In some embodiments, the method further comprises receiving data comprising a change to the first account of the first line of business product operating on a financial computing system and analyzing transaction data of the first account, by one or more processors of the computing system. The analyzing may comprise retrieving a list of needed data associated with an offer from the second line of business product operating on the financial computing system and matching the list of needed data to available data from the first account. In some embodiments, the method further comprises determining a permission level is sufficient to transmit the available data from the first account to the second line of business product operating on the financial computing system and transmitting the available data to the second line of business product operating on the financial computing system. In some embodiments, the method further comprises determining the available data does not contain all the needed data in the list of needed data while matching the list of needed data to available data from the first account, sending a request for a missing data consequent to determining the available data does not contain all the needed data, and receiving the missing data, the available data further comprising the received missing data, consequent to sending the request. In some embodiments, the method further comprises transmitting a transaction history from one of (1) the first account of the first line of business product to the second line of business product and (2) a second account of the second line of business product to the first line of business product, consequent to determining a permission level is sufficient. The shared data may further comprise the transaction history with the upcoming payment data identified from the transaction history.

In some embodiments, a system is described comprising a network interface, an account database configured to store account information for line of business products of a financial institution, and one or more processors configured to perform one or more elements of the above methods.

In some embodiments, the application is configured to display visual elements representing a plurality of applications associated with a plurality of accounts of line of business products. In some embodiments, the altered visual element of the application is one of the visual elements representing the plurality of applications associated with the plurality of accounts of line of business products. In some embodiments, the visual element is one of an icon, content of a pull-down menu, pre-populated form data, and formatting of a hyperlink.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
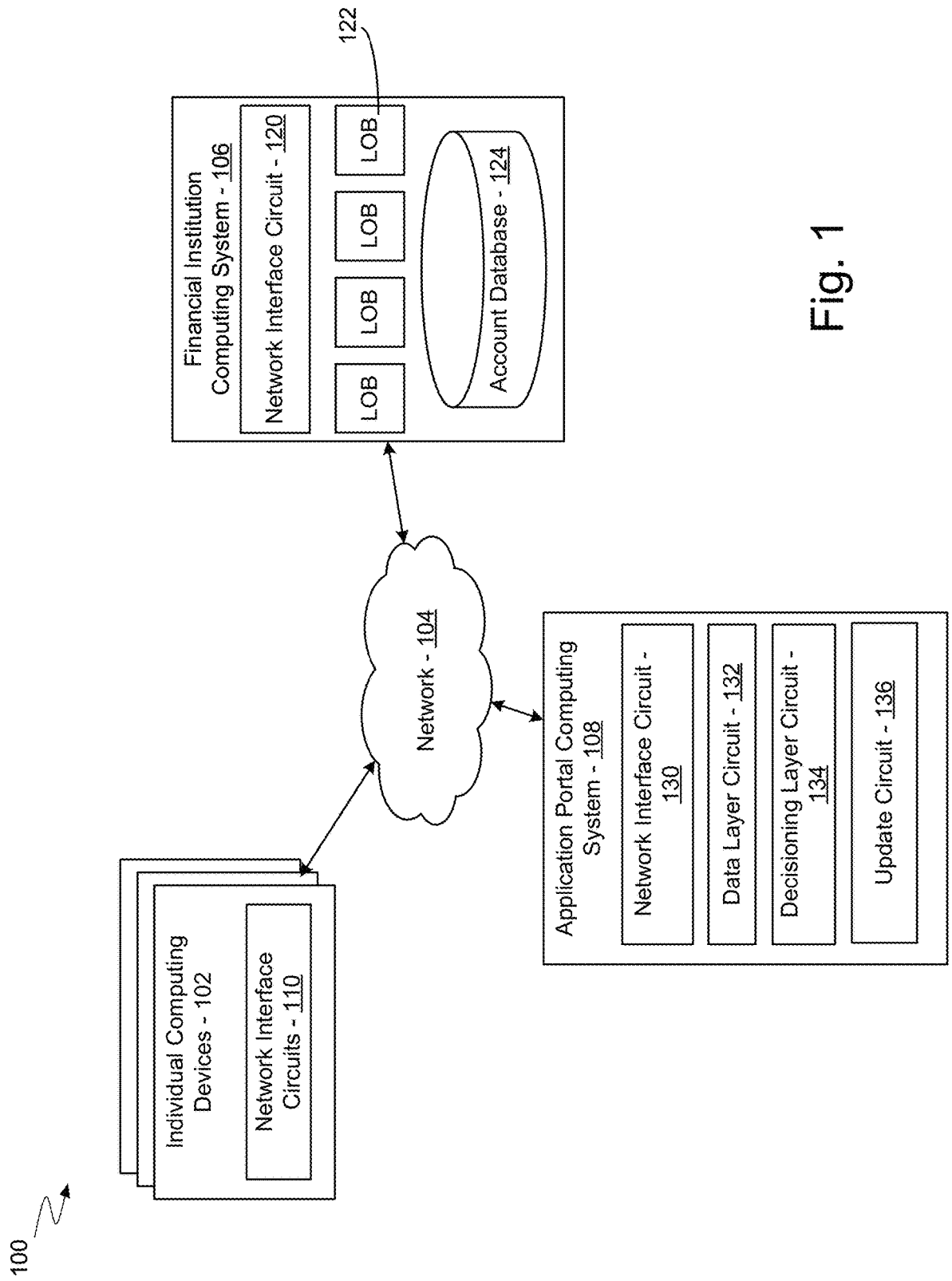
FIG. 1 is a block diagram of a system for facilitating default sharing between frequently used line of businesses according to an example embodiment.

Referring generally to the figures, systems and methods for facilitating default sharing between frequently used line of business products according to one or more example embodiments are shown. Such systems and methods make use of sharing of information between the line of business products. In some embodiments, this sharing of the data between line of business products facilitates a universal portal that may be personalized and/or customized in function and appearance. In some embodiments, the universal portal is an application on a user device that, at least, provides access to other applications running on the user device in a consolidated manner as well as additional functions present in the universal portal itself. In some embodiments, visual aspects of the presentation of applications and functionality are changed in the universal portal based on information that has been shared between different line of business products. In some embodiments, visual aspects that change may include which applications are displayed to the user, the order of applications, selection tabs available, options available in any selection tabs available, information displayed (e.g., status information), and the like. In some embodiments, new items for display to the user may be created in the universal portal such as to-do lists, offers, calendar events, and the like. In some embodiments, the computing system communicating with an installed universal portal (e.g., sending parameters and/or updates) communicates with a financial computing system. In some embodiments, the functionality of communicating with the installed universal portal is done by the financial computing system.

In addition, embodiments described herein solve the technical problem of determining the appearance and functionality of a graphical user interface based on selective sharing of information between line of business products running on a financial institution computing system. In some embodiments, certain applications represented in a universal portal application should be displayed, emphasized, pre-populated with initial data, and the like when certain conditions are met or events occur. This appearance and/or functionality change of the graphical user interface is addressed by leveraging an individual member's data as present in various line of business products and analyzing it to determine the data shared between the line of business products in creation of a triggering event or alert.

Further, embodiments described herein solve the and internet-centric problem of providing updates, parameter values, and other information to a portal application based on selective sharing of information between line of business products running on a financial institution computing system. In some embodiments, certain applications represented in a universal portal application should be displayed, emphasized, pre-populated with initial data, and the like when certain conditions are met or events occur. This appearance and/or functionality change of the graphical user interface is addressed by leveraging an individual member's data as present in various line of business products and analyzing it to determine the data shared between the line of business products in creation of a triggering event or alert.

Further, embodiments described herein solve the technical and internet-centric problem of analyzing transaction data related to a triggering event to determine when to selectively share information between line of business products to provide additional functionality, services, and/or relevant data while preserving privacy. In some embodiments, privacy is preserved by limiting the sharing of data to only the data determined to be needed to be shared upon a triggering event. In some embodiments, the selective sharing of data allows for transmission of an offer not available prior to the sharing of data.

Referring now to FIG. 1, an embodiment of an environment 100 is depicted. In brief overview, the environment 100 includes one or more one or more individual computing devices 102 used by individuals connected to a network 104. Also connected to the network 104 are an application portal computing system 108 and a financial institution computing system 106. In some embodiments, the individual computing devices 102 communicate over the network 104 to the application portal computing system 108 and to the financial institution computing system 106 using individual computing devices 108 such as smartphones, laptop computers, desktop computers, tablet computers, and the like. In some arrangements, the application portal computing system 108 communicates to the individual computing devices 102 and the financial institution computing system 106 over the network 104. In some arrangements, the financial institution computing system 106 communicates to the individual computing devices 102 and the application portal computing system 108 over the network 104. In some arrangements, the application portal computing system 108 is incorporated into the financial institution computing system 106 or vice versa. In arrangements where the application portal computing system 108 and financial institution computing system 106 are separate computing systems from the other computing systems communicating over the network 104, communication and sharing of information may be aided by application programming interfaces (APIs). The APIs are installed on one or more of the computing systems to facilitate sharing content and data. For example, an API is installed on the application portal computing system 108 to share some or all account database 124 information with the application portal computing system 108. In reference to components described herein, references to the components in singular or in plural form are not intended as disclaimers of alternative arrangements unless otherwise indicated. The components are configured to interact, in some arrangements, as described in further detail below.

In the environment 100, data communication between, the individual computing devices 102, the financial institution computing system 106, and the application portal computing system 108 in various combinations is facilitated by the network 104. In some arrangements, the network 104 includes the internet. In other arrangements or combinations, the network 104 includes a local area network or a wide area network. The network 104 may be facilitated by short and/or long range communication technologies including Bluetooth transceivers, Bluetooth beacons, RFID transceivers, NFC transceivers, Wi-Fi transceivers, cellular transceivers, wired network connections, etc.

Still referring to FIG. 1, the individuals using individual computing devices 102 may be in communication with and/or have accounts with the financial institution computing system 106. The individuals may access to the application portal computing system 108 by having an account or otherwise through installation of a universal portal application. In some arrangements, individuals may include single persons as well as households and families and also include, companies, corporations, or other entities using the system (s) herein to access various products of lines of business. Individuals may communicate over a respective network interface circuit 110 over the network 104 to a financial institution computing system 106, and/or an application portal computing system 108 via individual computing devices 102, such as smartphones, laptop computers, desktop computers, tablet computers, and the like. Data passing through the respective network interface circuits 110 may be encrypted such that the network interface circuit 110 is a secure communication module.

The financial institution computing system 106 may be associated with a financial institution (e.g., a bank, a credit card issuer, etc.). The financial institution computing system 106 includes a network interface circuit 120, a plurality of line of business product circuits 122, and an account database 124. The plurality of line of business product circuits 122 controls at least some operations of the financial institution computing system 106 using data stored in databases or other computer storage structures, such as the account database 124 to facilitate and process transactions involving the respective line of business products. In some embodiments, the line of business product circuits 122 is configured to share data associated with one or more accounts between two or more line of business products. Data passing through the network interface circuit 120 may be encrypted such that the network interface circuit 120 is a secure communication module. In some arrangements, the network interface circuit 120, line of business product circuits 122, and the account database 124 reside in part on different servers in relation to other components or to the whole of a particular component.

In some embodiments, the line of business product circuits 122 can be configured to share data between accounts in the respective line of business product associated with individuals and businesses that have ownership of the accounts with the financial institution. The individuals and businesses may have information on the accounts stored in the account database 124 of the financial institution computing system 106. In some arrangements, the individuals and businesses are also account holders of the financial institution with the respective account information contained in the account database 124. In other arrangements, the individuals or businesses do not have an account with the financial institution computing system 106, but other information related to opening a future account is accessible using the network interface circuit 120 of the financial institution computing system 106 (e.g., information from an application, credit scores from a credit reporting agency, 3rd party financial institution information, and the like). In some embodiments, information available from one or more accounts of a plurality of line of business products may include transaction history of financial products, credit scores, liquid asset positions, liquidity ratio (e.g., liquid assets/monthly expenses), asset to debt ratio (e.g., total assets/total liabilities), current ratio (e.g., liquid assets/short term liabilities), debt service ratio (e.g., short term liabilities/total income), saving ratio (e.g., monthly surplus once recurring liabilities paid), set monthly costs, expenditure volatility, overhead costs, overhead expense percentage (e.g., overhead expenses/sales), expenditure volatility, seasonal variability, profitability ratios, leverage ratios, revenue growth, gross profit margin, operating margin, and the like.

In some embodiments, the application portal computing system 108 is configured to interface with and send adjustments to visual interfaces of universal portal applications to individual computing devices 102 of account holders of various accounts of line of business products associated with the financial institution computing system 106. The application portal computing system 108 includes a network interface circuit 130, a data layer circuit 132, a decisioning layer circuit 134, and an update circuit 136. Data passing through the network interface circuit 130 may be encrypted such that the network interface 130 is a secure communication module. The data layer circuit 132 is configured to access data from lines of business operating on a financial computing system 106. The decisioning layer circuit 134 is configured to analyze the data accessed from the lines of business. The update circuit 136 is configured to adjust the functionality and visual interface of the universal portal applications operating on individual computing devices 192. In some arrangements, the network circuit 130, the data layer circuit 132, the decisioning layer circuit 134, and the update circuit reside in part on different servers in relation to other components or to the whole of a particular component. In some arrangements, parts or all of the application portal computing system 108 as described herein runs on or is configured to run on the financial institution computing system 106. In some arrangements, all or a subset of any of the application portal computing system 108 and the financial institution computing system 106 run on the same server computing system.

The data layer circuit 132 is configured to access data from lines of business operating on a financial computing system 106. In some embodiments, the data layer circuit 132 is configured to access data associated with one or more line of business products such as a request for a service from a line of business product, a fulfillment of a request for a service from a line of business product, a request for a new account associated with a line of business product, an opening of a new account associated with a line of business product, an analysis of financial transaction history associated with an account, an analysis of data from social media, and the like. In some embodiments, the data layer circuit 132 is configured to access data associated with a request for a service from a line of business product. The request for a service from a line of business product may be accompanied by one or more of personal identity information, financial information, account information or other information necessary for the line of business product to successfully supply the requested service. In some embodiments, the data layer circuit 132 is configured to access data associated with fulfillment of a request for a service from a line of business product. The fulfillment of the request for a service may be an indication that sufficient information was provided by an account holder to successfully fulfill the request for the device. In some embodiments, the data layer circuit 132 is configured to access data associated with a request for a new account associated with a line of business product. The request for a new account may be accompanied by one or more of personal identity information, financial information, account information or other information necessary for the line of business product to successfully open a new account with the line of business product. In some embodiments, the data layer circuit 132 is configured to access data associated with an output from an analysis of financial transaction history associated with an account (e.g., an account of a line of business product). The analysis of financial transaction history may indicate a need and/or change in financial health of the account that is a triggering event. In some embodiments, the data layer circuit 132 is configured to access data associated with an analysis of data from social media associated with the holder of an account of a line of business product. The analysis of data from social media may indicate a need and/or change in financial health of the holder, major life events, and the like. In some embodiments, the data layer circuit 132 is configured to access data associated with life changing events as available from a line of business product (e.g., an indication that a business has just been started due to opening a business account, an indication of a new dependent based on opening a custodial account, an indication of higher revenue for a business due to an increased installment payment for taxes, or other indications that an individual is in a position to spend more or in a position to spend less than usual).

In some embodiments, the data layer circuit 132 is further configured to access additional data related to an event that may be obtainable from other sources of information such as data from other line of business products, financial transaction history, $3^{rd}$ party sources such as credit reports, industry consortium databases, social media, etc., sent data inquiries, and the like. In some embodiments, data of the nature required is associated with accounts from other line of business products and a data share is initiated with the other line of business product. In some embodiments, there is a probability determination that the additional data is obtainable from one of the other sources of information and the determination that additional data is available is based on the probability meeting or exceeding a predetermined threshold.

In some embodiments, the data layer circuit 132 is configured to initiate a data share. In some embodiments, the data layer circuit 132 is configured to initiate a data share upon receiving an indication that there is sufficient data available for the data share. In some embodiments, the data share is between two or more line of business products operating on a financial institution computing system 106. In some embodiments, this follows a determination that an additional needed data or additional data has been obtained and there is now sufficient data available for the data share. In some embodiments, the data layer circuit 132 is configured to receive a determination that there is a sufficient permission level to initiate the data share.

The decisioning layer circuit 134 is configured to analyze the data accessed from the lines of business operating on a financial computing system 106. In some embodiments, the decisioning layer circuit 134 is configured to determine whether there is sufficient data to initiate a data share. In some embodiments, the decisioning layer circuit 134 is configured to compare transaction data or other data associated with a triggering event against data requirements of services offered by line of business products for a match. In some embodiments, the decisioning layer circuit 134 is configured to compare transaction data or other data associated with a triggering event against data requirements of new or upgraded accounts operated by line of business products for a match. In some embodiments, the decisioning layer circuit 134 is configured to categorize data requirements as mandatory or optional to determine if there is sufficient data. In some embodiments, the decisioning layer circuit 134 is configured to determine whether there is sufficient data by requiring a number or level of data that meets or exceeds a threshold level of data needed for an offer for a service, account, account change, or upgrade to an account.

In some embodiments, the decisioning layer circuit 134 is configured to determine whether additional data is obtainable consequent to a determination that there is not enough data available In some embodiments, the decisioning layer circuit 134 is configured to compare transaction data or other data associated with a triggering event against data requirements of services offered by line of business products for a match. In some embodiments, the decisioning layer circuit 134 is configured to compare transaction data or other data associated with a triggering event against data requirements of new or upgraded accounts operated by line of business products for a match. In some embodiments, the decisioning layer circuit 134 is configured to utilize data categorized as mandatory or optional to determine if there is sufficient data. In some embodiments, the decisioning layer circuit 134 is configured to match data matching data requirements that is not present against other sources of information such as data from other line of business products, financial transaction history, $3^{rd}$ party sources such as credit reports, social media, etc., sent data inquiries, and the like. In some embodiments, the decisioning layer circuit 134 is configured to determine that data that is available is based on a timeframe on when that data was acquired. For example, data related to a home appraisal may still be considered valid for use for a new purpose if the time elapsed since the appraisal is below a pre-determined threshold.

In some embodiments, the decisioning layer circuit 134 is configured to analyze data shared between line of business products. In some embodiments, the decisioning layer circuit 134 is configured to determine events related to an overall financial picture associated with an account holder of the two or more line of business products. In some embodiments, the decisioning layer circuit 134 is configured to determine an event based on analysis. In some embodiments, an event may be one of a request for a service from a line of business product, a fulfillment of a request for a service from a line of business product, a request for a new account associated with a line of business product, an opening of a new account associated with a line of business product, an analysis of financial transaction history associated with an account, an analysis of data from social media, and the like. In some embodiments, an event is a request for a service from a line of business product. In some embodiments, the event is a fulfillment of a request for a service from a line of business product. In some embodiments, the event is a request for a new account associated with a line of business product. In some embodiments, the event is an output from an analysis of financial transaction history associated with an account (e.g., an account of a line of business product). The analysis of financial transaction history may indicate a need and/or change in financial health of the account that is a triggering event. In some embodiments, the event is an output from an analysis of financial transaction history associated with an account of a line of business product when combined with the financial transaction history of one or more other line of business product accounts. In some embodiments, an event is an analysis of data from social media associated with the holder of an account of a line of business product. The analysis of data from social media may indicate a need and/or change in financial health of the holder, major life events, and the like.

In some embodiments, the decisioning layer circuit 134 is configured to determine whether an application action is needed consequent to a determined event. In some embodiments, an application action is a new or updated parameter to change a visual aspect of an application (e.g., a universal portal application). In some embodiments, an application action is a new or updated parameter to change a functionality of an application such as populations of pull down menus, options available for settings of the application, pre-populated form data, pre-populated initialization data when opening other applications from within the application, formatting of hyperlinks in the application, and the like. In some embodiments, applications associated with events that require more immediate action may be emphasized (e.g., by order of appearance, size, color, animation, etc.).

The update circuit 136 is configured to adjust the functionality and visual interface of the universal portal applications operating on individual computing devices 102. In some embodiments, the update circuit 136 is configured to transmit a change to functionality or visual interface consequent to the initiation of a data share. In some embodiments, the update circuit 136 is configured to transmit an offer consequent to the initiation of a data share. In some embodiments, the offer is based on a determination that there is sufficient information to pre-approve all or components of the offer based on the data shared between two or more line of business products. For example, the offer may be for a pre-approved home equity loan, the pre-approval based on information available due to the data share. In some embodiments, a permission level has been given by the account holder to allow for the data share in situations such as this. In another example, a pre-approved offer for a personal loan is sent based on information from the data share sufficient for the approval and an analysis of financial transaction data determining that a personal loan would be beneficial to the account holder.

In some embodiments, the update circuit 136 is configured to transmit a change to functionality or visual interface consequent to the initiation of a data share. In some embodiments, the update circuit 136 is configured to transmit a parameter, a value of a parameter, or data accompanying a parameter to a portal application consequent to a determination that an application action is needed. In some embodiments, the update circuit 136 is configured to transmit a value of the parameter to a portal application. In some embodiments, the update circuit 136 is configured to transmit a new or updated parameter or a new or updated value of a parameter that changes a visual aspect of an application (e.g., a universal portal application). In some embodiments, the update circuit 136 is configured to transmit a new or updated parameter to change the functionality of a sub-component of the portal application, functionality such as appearance of application icons accessible through the portal application, populations of pull down menus, options available for settings of the application, pre-populated form data, pre-populated initialization data when opening other applications from within the application, formatting of hyperlinks in the application, and the like. In some embodiments, the new or updated parameter determines the population of a pull-down menu and whether an item in the pull-down menu is present. In some embodiments, the new or updated parameter determines, the order of items in a pull-down menu. In some embodiments, pre-populated form data is provided as part of the new or updated parameter or accompanying the new or updated parameter and used to fill in a form in the portal application. The filled out form may be used as an input to one of the applications accessible through the portal application. In some embodiments, pre-populated initialization data is provided as part of the new or updated parameter or accompanying the new or updated parameter and used as an input to one of the applications accessible through the portal application. In some embodiments, the formatting of hyperlinks available in the portal application is determined by the new or updated parameter or other data accompanying the new or updated parameter. The formatting of the hyperlink may determine a customizable landing page that is accessible associated with one of the applications accessible through the portal application. The formatting of the hyperlink may also affect the appearance of the landing page. The formatting of the hyperlink may allow access to particular functions associated with one of the applications accessible through the portal application that would not be accessible otherwise or would require more steps to gain access to.

Figure 2:
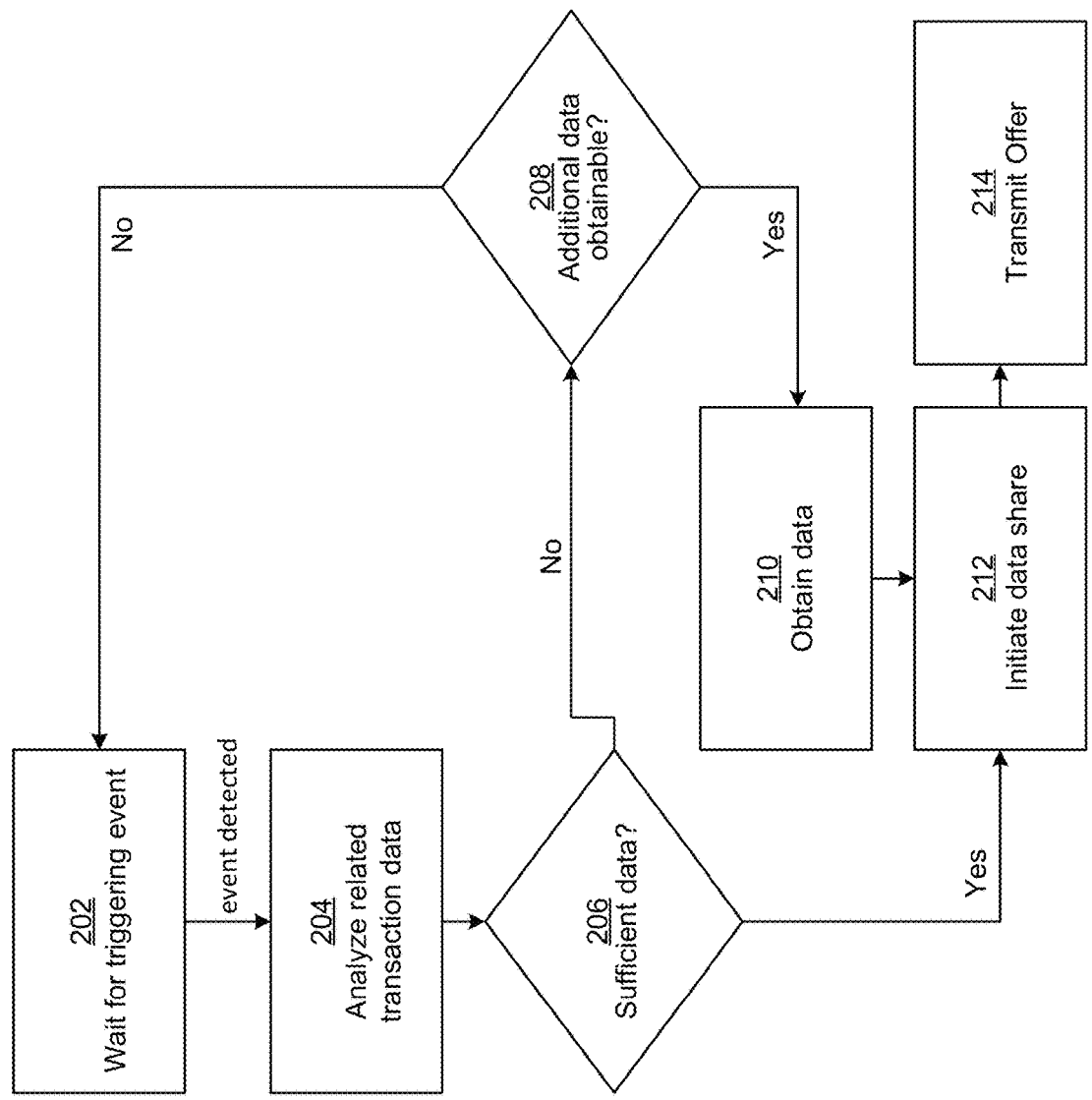
FIG. 2 is a flow diagram of a method of analyzing data prompted by a triggering event to initiate a data share according to an example embodiment.

Referring now to FIG. 2, a flow diagram of a method 200 of analyzing data prompted by a triggering event to initiate a data share is shown according to an example embodiment. The method 200 is performed by a computing system (e.g., an application portal computing system 108). In some arrangements, method 200 is performed by the application portal computing system 108. In other arrangements, method 200 is performed by the financial institution computing system 106 configured to contain some or all of the functionality of the application portal computing system 108. Various combinations are also possible with the steps of the method 200 performed across two or more computing systems (e.g. on the financial institution computing system 106 and the application portal computing system 108). While performing the method 200, the application portal computing system 108, for example, may communicate data over a network interface circuit 130 over the network 104 to individual computing devices 102 as well as to a financial institution computing system 106. Individuals and/or businesses associated with the individual computing devices 102 as used in some embodiments of the method have opted in or provide sufficient permissions to share data between the various computing systems as well as between line of business products operating on the financial institution computing system 106.

The method 200 begins when a computing system receives a triggering event at 202. Transaction data is analyzed that is related to the triggering event and/or to one or more accounts associated with a user of the individual computing device 102 at 204. A determination is made at 206 that there is sufficient data to continue with the method. If there is not sufficient data to continue, a determination is made at 208 whether there is additional data that is obtainable for there to be sufficient data. If there is no additional data that is obtainable, the method returns to waiting for a triggering event at 202. If there is sufficient data to continue, a data share is initiated at 212 and an offer transmitted at 214.

Continuing with FIG. 2 in more detail, a triggering event is received by a computing system at 202. In some embodiments, a triggering event may be one of a request for a service from a line of business product, a fulfillment of a request for a service from a line of business product, a request for a new account associated with a line of business product, an opening of a new account associated with a line of business product, an analysis of financial transaction history associated with an account, an analysis of data from social media, and the like. In some embodiments, a triggering event is a request for a service from a line of business product. The request for a service from a line of business product may be accompanied by one or more of personal identity information, financial information, account information or other information necessary for the line of business product to successfully supply the requested service. In some embodiments, the triggering event is a fulfillment of a request for a service from a line of business product. The fulfillment of the request for a service may be an indication that sufficient information was provided by an account holder to successfully fulfill the request for the device. In some embodiments, the triggering event is a request for a new account associated with a line of business product. The request for a new account may be accompanied by one or more of personal identity information, financial information, account information or other information necessary for the line of business product to successfully open a new account with the line of business product. In some embodiments, the triggering event is an output from an analysis of financial transaction history associated with an account (e.g., an account of a line of business product). The analysis of financial transaction history may indicate a need and/or change in financial health of the account that is a triggering event. In some embodiments, a triggering event is an analysis of data from social media associated with the holder of an account of a line of business product. The analysis of data from social media may indicate a need and/or change in financial health of the holder, major life events, and the like. In some embodiments a triggering event may be life changing events (e.g., an indication that a business has just been started due to opening a business account, an indication of a new dependent based on opening a custodial account, an indication of higher revenue for a business due to an increased installment payment for taxes, or other indications that an individual is in a position to spend more or in a position to spend less than usual).

Transaction data related to the triggering event is analyzed by a computing system at 204. In some embodiments, transaction data is data that has been supplied by an account holder of a line of business product as part of a transaction associated with the triggering event. In some embodiments, a triggering event may be one of a request for a service from a line of business product, a fulfillment of a request for a service from a line of business product, a request for a new account associated with a line of business product, an opening of a new account associated with a line of business product, an analysis of financial transaction history associated with an account, an analysis of data from social media, and the like. In some embodiments, the transaction data related to the triggering event is analyzed to detect potential offers and which lines of business would need to share data in order to make the potential offer. In some embodiments, the data is analyzed to determine what products from lines of business, an account holder may potentially be interested in. The analysis may be based on what products are currently in use by the account holder and payment history for those products. In some embodiments, the data is analyzed to determine what other products are used by similar account holders based on a match between the accounts of the account holder and the similar account holders and financial history and/or payment history of the account holder and the similar account holders. In some embodiments, similarity between account holders is determined by a match between the types of financial transaction information exceeding a predetermined threshold. In some embodiments, demographic similarities between account holders are also factored in.

A determination whether there is sufficient data is made by a computing system at 206. In some embodiments, transaction data or other data associated with a triggering event is compared against data requirements of services offered by line of business products for a match. In some embodiments, transaction data or other data associated with a triggering event is compared against data requirements of new or upgraded accounts operated by line of business products for a match. In some embodiments, data requirements may be categorized as mandatory or optional to determine if there is sufficient data. In some embodiments, a determination whether there is sufficient data requires a number or level of data that meets or exceeds a threshold level of data needed for an offer for a service, account, account change, or upgrade to an account.

A determination whether additional data is obtainable is made by a computing system at 208. In some embodiments, this follows a determination that there is not sufficient data. In some embodiments, transaction data or other data associated with a triggering event is compared against data requirements of services offered by line of business products for a match. In some embodiments, transaction data or other data associated with a triggering event is compared against data requirements of new or upgraded accounts operated by line of business products for a match. In some embodiments, data requirements may be categorized as mandatory or optional to determine if there is sufficient data. Data matching data requirements that is not present may be matched against other sources of information such as data from other line of business products, financial transaction history, $3^{rd}$ party sources such as credit reports, social media, etc., sent data inquiries, and the like. In some embodiments, a determination that data is available is based on a timeframe on when that data was acquired. For example, data related to a home appraisal may still be considered valid for use for a new purpose if the time elapsed since the appraisal is below a pre-determined threshold.

A computing system obtains data at 210 responsive to a determination that additional data is obtainable. In some embodiments, additional data may be obtainable from other sources of information such as data from other line of business products, financial transaction history, $3^{rd}$ party sources such as credit reports, industry consortium databases, social media, etc., sent data inquiries, and the like. In some embodiments, data of the nature required is associated with accounts from other line of business products and a data share is initiated with the other line of business product. In some embodiments, there is a probability determination that the additional data is obtainable from on of the other sources of information and the determination that additional data is available is based on the probability meeting or exceeding a predetermined threshold.

A data share is initiated by a computing system at 212. In some embodiments, this follows a determination that there is sufficient data available for the data share. In some embodiments, the data share is between two or more line of business products operating on a financial institution computing system 106. In some embodiments, this follows a determination that an additional needed data or additional data has been obtained and there is now sufficient data available for the data share. In some embodiments, there is also a determination that there is a sufficient permission level to initiate the data share.

An offer is transmitted by the computing system at 214, consequent to the initiation of the data share. In some embodiments, the offer is based on a determination that there is sufficient information to pre-approve all or components of the offer based on the data shared between two or more line of business products. For example, the offer may be for a pre-approved home equity loan, the pre-approval based on information available due to the data share. In some embodiments, a permission level has been given by the account holder to allow for the data share in situations such as this. In another example, a pre-approved offer for a personal loan is sent based on information from the data share sufficient for the approval and an analysis of financial transaction data determining that a personal loan would be beneficial to the account holder.

Figure 3:
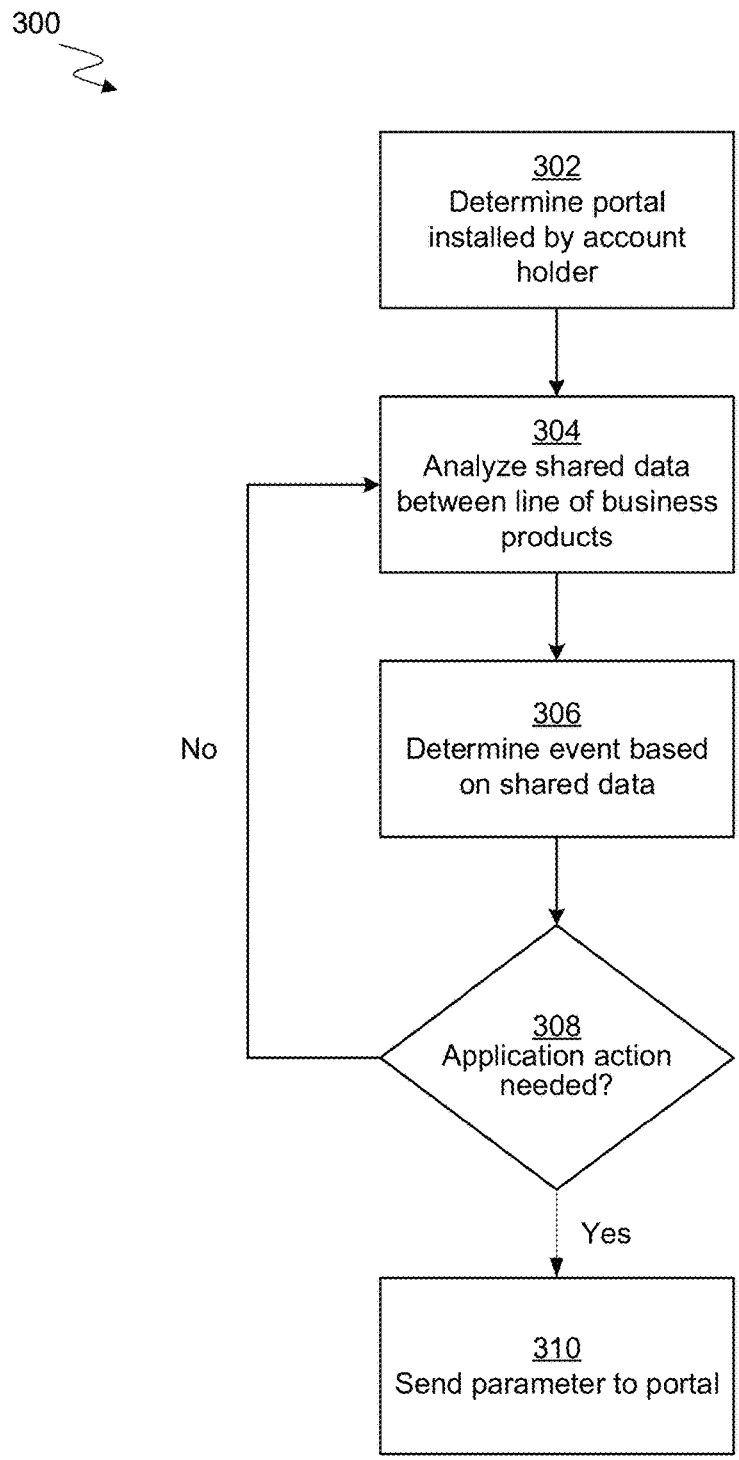
FIG. 3 is a flow diagram of a method of determining a parameter to send or update to a portal application according to an example embodiment.

Referring now to FIG. 3, a flow diagram of a method 300 of determining a parameter to send or update to a portal application is shown according to an example embodiment. The method 300 is performed by a computing system (e.g., an application portal computing system 108). In some arrangements, method 300 is performed by the application portal computing system 108. In other arrangements, method 300 is performed by the financial institution computing system 106 configured to contain some or all the functionality of the application portal computing system 108. Various combinations are also possible with the steps of the method 300 performed across two or more computing systems (e.g. on the financial institution computing system 106 and the application portal computing system 108). While performing the method 300, the application portal computing system 108, for example, may communicate data over a network interface circuit 130 over the network 104 to individual computing devices 102 as well as to a financial institution computing system 106. Individuals and/or businesses associated with the individual computing devices 102 as used in some embodiments of the method have opted in or provide sufficient permissions to share data between the various computing systems as well as between line of business products operating on the financial institution computing system 106.

The method 300 begins when a computing system determines that a universal portal application is installed by an account holder on an individual computing device 102 at 302. Data shared between line of business products is analyzed at 304 and an event is determined based on the analysis at 306. A determination is made whether an application action is needed consequent to the event at 308. If no application action is needed, the method continues to analyze the data shared between line of business products at 304. If an application action is needed, a parameter is sent to the portal application at 310.

Continuing with FIG. 3 in more detail, a computing system determines that a universal portal application is installed by an account holder on an individual computing device 102 at 302. In some embodiments, the determination is made consequent to communication between the computing system and the individual computing device 102 with the installed universal portal application. In some embodiments, a record is retrieved comprising an indication that an individual computing device 102 of an account holder has installed the universal portal application.

Data shared between line of business products is analyzed by a computing device at 304. In some embodiments, In some embodiments, consequent to the data shared between two or more line of business products, determinations of events can be made related to an overall financial picture associated with an account holder of the two or more line of business products.

An event is determined based on the analysis by a computing device at 306. In some embodiments, an event may be one of a request for a service from a line of business product, a fulfillment of a request for a service from a line of business product, a request for a new account associated with a line of business product, an opening of a new account associated with a line of business product, an analysis of financial transaction history associated with an account, an analysis of data from social media, and the like. In some embodiments, an event is a request for a service from a line of business product. In some embodiments, the event is a fulfillment of a request for a service from a line of business product. In some embodiments, the event is a request for a new account associated with a line of business product. In some embodiments, the event is an output from an analysis of financial transaction history associated with an account (e.g., an account of a line of business product). The analysis of financial transaction history may indicate a need and/or change in financial health of the account that is a triggering event. In some embodiments, the event is an output from an analysis of financial transaction history associated with an account of a line of business product when combined with the financial transaction history of one or more other line of business product accounts. In some embodiments, an event is an analysis of data from social media associated with the holder of an account of a line of business product. The analysis of data from social media may indicate a need and/or change in financial health of the holder, major life events, and the like.

A determination whether an application action is needed is made by a computing device at 308 consequent to the determined event. In some embodiments, an application action is a new or updated parameter to change a visual aspect of an application (e.g., a universal portal application). In some embodiments, an application action is a new or updated parameter to change a functionality of an application such as populations of pull down menus, options available for settings of the application, pre-populated form data, pre-populated initialization data when opening other applications from within the application, formatting of hyperlinks in the application, and the like. In some embodiments, applications associated with events that require more immediate action may be emphasized (e.g., by order of appearance, size, color, animation, etc.).

A parameter is sent to a portal application by a computing system at 310 consequent to a determination that an application action is needed. In some embodiments, a value of the parameter is sent to a portal application. In some embodiments, a new or updated parameter or a new or updated value of a parameter is sent that changes a visual aspect of an application (e.g., a universal portal application). In some embodiments, a new or updated parameter is sent to change the functionality of a sub-component of the portal application, functionality such as appearance of application icons accessible through the portal application, populations of pull down menus, options available for settings of the application, pre-populated form data, pre-populated initialization data when opening other applications from within the application, formatting of hyperlinks in the application, and the like. In some embodiments, the new or updated parameter determines the population of a pull-down menu and whether an item in the pull-down menu is present. In some embodiments, the new or updated parameter determines, the order of items in a pull-down menu. In some embodiments, pre-populated form data is provided as part of the new or updated parameter or accompanying the new or updated parameter and used to fill in a form in the portal application. The filled out form may be used as an input to one of the applications accessible through the portal application. In some embodiments, pre-populated initialization data is provided as part of the new or updated parameter or accompanying the new or updated parameter and used as an input to one of the applications accessible through the portal application. In some embodiments, the formatting of hyperlinks available in the portal application is determined by the new or updated parameter or other data accompanying the new or updated parameter. The formatting of the hyperlink may determine a customizable landing page that is accessible associated with one of the applications accessible through the portal application. The formatting of the hyperlink may also affect the appearance of the landing page. The formatting of the hyperlink may allow access to particular functions associated with one of the applications accessible through the portal application that would not be accessible otherwise or would require more steps to gain access to.

Figure 4:
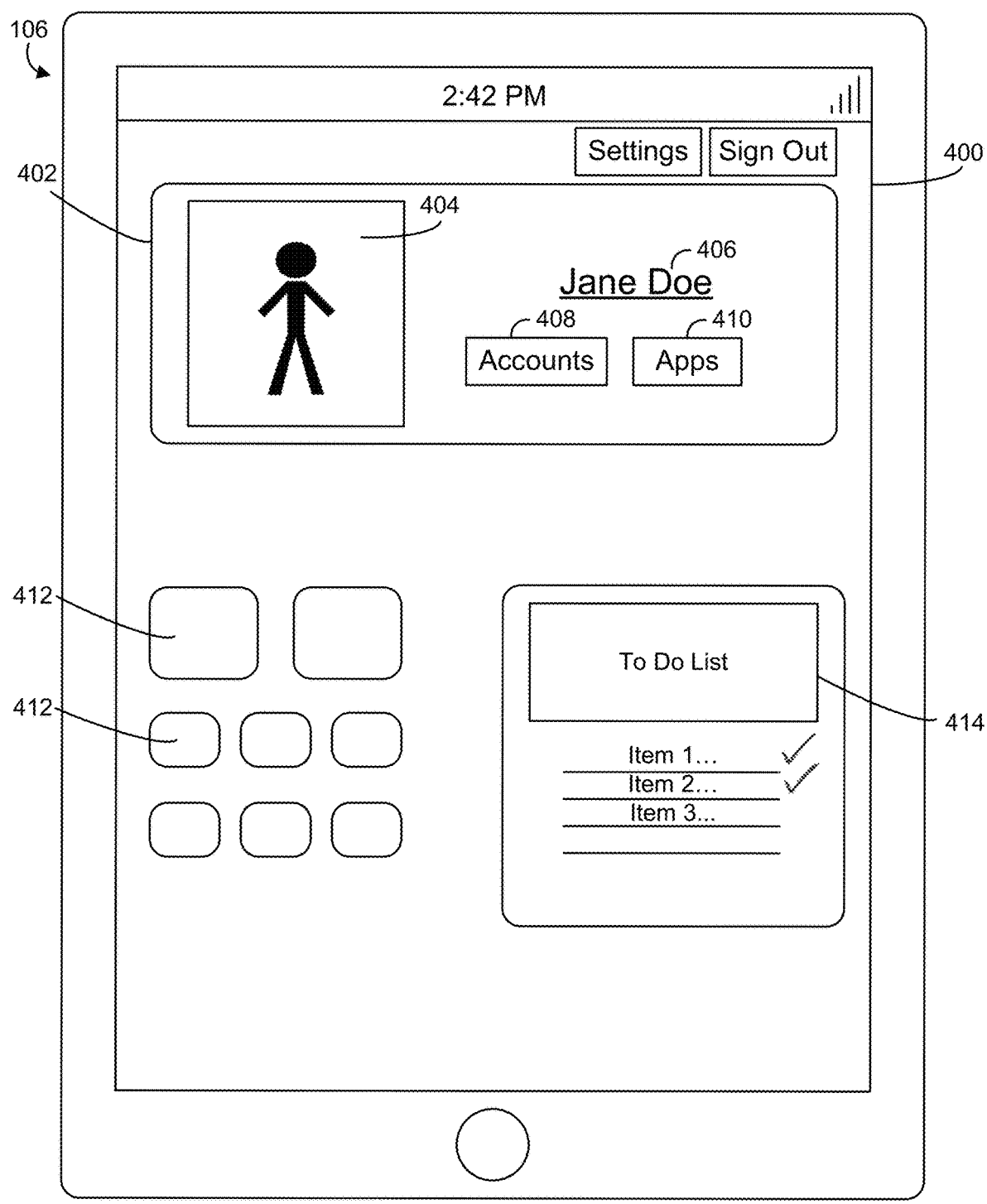
FIG. 4 is an interface on a display of an individual computing device, including graphics displaying a portal application according to an example embodiment.

Referring now to FIG. 4, an interface 400 on a display of an individual computing device 102, including graphics displaying available applications as well as generated information such as 'to-do' lists is shown according to an example embodiment. In one embodiment, the interface 400 and/or any generated information and/or generated parameter values affecting an appearance of the interface 400 is provided by the application portal computing system 108 (e.g., by the update circuit 136). Other embodiments may have one or more components of the interface 400 provided by the financial institution computing system 106. The interface 400 may include information relating to various applications related to accounts (e.g., accounts associated with line of business products operating on the financial institution computing system) held by an individual user of the application portal computing system 108. An identifying profile may be provided by the application portal computing system 108. A profile area 402 of the interface 400 includes information relating to the individual user, including a profile picture 404 and a user name 406. The profile picture 404 and user name 406 may be selected by the user. In some embodiments, a user name 406 is a user name associated with an account associated with a line of business product. A user can access a list of accounts and installed applications associated with line of business products by interacting with buttons 408 and 410 respectively. Various installed applications can be accessed and/or launched from within the interface 400 using launch buttons 412. In some embodiments, the launch buttons 412 may be of varying sizes to emphasize one or more of the applications over the others as depicted based on parameter values received by the interface 400. In some embodiments, the order of the launch buttons 412 is changed based on parameter values received by the interface 400. In some embodiments, one or more display areas 414 are used to display generated information such as to-do lists, alerts, and the like. In some embodiments, a to-do list is displayed in a display area 414 to list steps to complete to accomplish a task consequent to analysis of data shared between two or more line of business products associated with the launch buttons 412. In some embodiments, offers received are displayed in a display area 414, the offers based on analysis of data shared between two or more line of business products associated with the launch buttons 412. Other embodiments of interface 400 for interaction with a universal application portal may contain similar features. In some embodiments, all the applications accessible and/or launchable from the universal application portal are associated with a line of business product of a single financial institution. In some embodiments, applications for other financial institutions or other related applications are also accessible from the universal application portal.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A computer-implemented method comprising:
receiving, by one or more processors of a computing system, data comprising a change to a first account of a first line of business product;
analyzing, by the one or more processors, available data of the first account, wherein analyzing the available data comprises:
retrieving a list of needed data associated with an offer from a second line of business product operating on the financial computing system, and
matching the list of needed data to the available data from the first account;
identifying, by the one or more processors, missing data from the list of needed data based on matching the list of needed data to the available data from the first account;
sending, by the one or more processors, a request for the missing data to a computing device associated with the first account;
receiving, by the one or more processors, the missing data from the computing device;
determining, by the one or more processors, a permission level provided by an account holder corresponding to the first account, the permission level authorizing a data share between the first line of business product and the second line of business product;
transmitting, by the one or more processors, the available data and the missing data to the second line of business product operating on the financial computing system based on the permission level corresponding to the first account;
determining, by the one or more processors, that the offer from the second line of business product is available based on the available data and the missing data transmitted to the second line of business product; and
transmitting, by the one or more processors, a parameter to the computing device based on determining that the offer from the second line of business product is available, wherein the parameter transmitted to the computing device causes the computing device to alter a visual element based on the transmitted parameter and display the altered visual element to the account holder via a user interface, the altered visual element associated with the second line of business product.

2. The computer-implemented method of claim 1, wherein determining that the offer from the second line of business product is available comprises identifying an upcoming payment date associated with one of the first line of business product or the second line of business product.

3. The computer-implemented method of claim 2 further comprising:
 transmitting a transaction history from one of (1) the first account of the first line of business product to the second line of business product and (2) a second account of the second line of business product to the first line of business product, based on the permission level of the first account.

4. The computer-implemented method of claim 1, wherein the user interface rendered by the computing device displays a plurality visual elements associated with a plurality of accounts of line of business products.

5. The computer-implemented method of claim 1, wherein the visual element of the user interface is altered to show a change based on the account holder accepting the offer for the second line of business product.

6. The computer-implemented method of claim 1, wherein the visual element is one of an icon, content of a pull-down menu, pre-populated form data, and formatting of a hyperlink.

7. A system comprising:
 a network interface;
 an account database configured to store account information for line of business products of a financial institution; and
 one or more processors configured for:
  receiving data comprising a change to a first account of a first line of business product operating on a financial computing system;
  analyzing available data of the first account retrieved from the account database, wherein analyzing the available data comprises:
   retrieving a list of needed data associated with an offer from a second line of business product operating on the financial computing system, and matching the list of needed data to the available data from the first account;
  identifying missing data from the list of needed data based on matching the available data from the first account to the list of needed data;
  sending a request for the missing data to a computing device associated with the first account;
  receiving the missing data from the computing device;
  determining a permission level provided by an account holder corresponding to the first account, the permission level authorizing a data share between the first line of business product and the second line of business product;
  transmitting, based on the determined permission level, the available data and the missing data to the second line of business product operating on the financial computing system;
  determining that the offer from the second line of business product is available based on the available data and the missing data transmitted to the second line of business product; and
  transmitting, via the network interface, a parameter to Ran the computing device responsive to determining that the offer from the second line of business product is available, wherein the parameter transmitted to the computing device causes the computing device to alter a visual element based on the transmitted parameter and display the altered visual element to the account holder via a user interface, wherein the altered visual element is associated with the second line of business product.

8. The system of claim 7, wherein the one or more processors are further configured for analyzing shared data comprising the available data between the first line of business product and the second line of business product, the shared data comprising the available data, wherein determining that the offer from the second line of business product is available is based on the shared data.

9. The system of claim 8, wherein the shared data further comprises an upcoming payment date associated with one of the first line of business product or the second line of business product.

10. The system of claim 8, wherein the shared data further comprises a transaction history of one of (1) the first account of the first line of business product or (2) a second account of the second line of business product.

11. The system of claim 7, wherein the user interface is presented on an application of the computing device, and wherein the user interface further comprises a plurality of visual elements associated with a plurality of accounts of line of business products.

12. The system of claim 11, wherein each of the plurality of visual elements including the altered visual elements represent a respective application associated with a line of business product.

13. The system of claim 8, wherein the visual element is one of an icon, content of a pull-down menu, pre-populated form data, and formatting of a hyperlink.

* * * * *